United States Patent
Douglas

(10) Patent No.: US 11,327,778 B2
(45) Date of Patent: *May 10, 2022

(54) APPLICATION DEPLOYMENT USING REDUCED OVERHEAD BYTECODE

(71) Applicant: Red Hat, Inc., Raleigh, NC (US)

(72) Inventor: Stuart Douglas, Orange (AU)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/104,806

(22) Filed: Nov. 25, 2020

(65) Prior Publication Data

US 2021/0081228 A1 Mar. 18, 2021

Related U.S. Application Data

(63) Continuation of application No. 16/224,264, filed on Dec. 18, 2018, now Pat. No. 10,853,109.

(51) Int. Cl.
*G06F 9/455* (2018.01)
*G06F 8/41* (2018.01)
*G06F 8/60* (2018.01)

(52) U.S. Cl.
CPC .............. *G06F 9/4552* (2013.01); *G06F 8/44* (2013.01); *G06F 8/60* (2013.01); *G06F 9/45504* (2013.01)

(58) Field of Classification Search
None
See application file for complete search history.

(56) References Cited

U.S. PATENT DOCUMENTS

| | | | |
|---|---|---|---|
| 6,549,955 | B2 | 4/2003 | Guthrie et al. |
| 6,901,588 | B1 | 5/2005 | Krapf et al. |
| 7,426,721 | B1 | 9/2008 | Saulpaugh et al. |
| 8,122,460 | B2 | 2/2012 | McCain et al. |
| 2006/0101437 | A1 | 5/2006 | Lee et al. |
| 2007/0089101 | A1 | 4/2007 | Romanovskiy |
| 2009/0094316 | A1 | 4/2009 | Chen et al. |
| 2010/0011342 | A1 | 1/2010 | Bhattacharyya et al. |
| 2010/0023943 | A1 | 1/2010 | Arthurs et al. |
| 2014/0101278 | A1 | 4/2014 | Raman et al. |
| 2014/0229947 | A1 | 8/2014 | Daudel et al. |

OTHER PUBLICATIONS

Rafael Winterhalter; "Byte Buddy"; GitHub—raphw/byte-buddy: Runtime code generation for the Java virtual machine; https://github.com/raphw/byte-buddy; © 2018 GitHub, Inc; Scienta AS, Arbinsgate 11, 0253; Oslo, Norway; Retrieved on Nov. 11, 2018; (5 Pages).

(Continued)

*Primary Examiner* — Qing Chen
(74) *Attorney, Agent, or Firm* — K&L Gates LLP

(57) ABSTRACT

A system includes a memory, a processor in communication with the memory, and a recorder. The recorder is configured to obtain a proxy for each respective real object. Each respective real object is related to a respective service. The recorder is also configured to record a sequence of each invocation on each respective proxy and generate an intermediate representation of an application that is configured to invoke the sequence of each invocation on each real object associated with each respective proxy.

17 Claims, 7 Drawing Sheets

(56) References Cited

OTHER PUBLICATIONS

Dominic Fox, New Tricks with Dynamic Proxies in Java 8 Part 1—Introduction: Why Use Dynamic Proxies?; published Jul. 13, 2015; https://opencredo.com/blogs/dynamic-proxies-java/; Retrieved on Dec. 18, 2018; (6 Pages).

Dominic Fox, New Tricks with Dynamic Proxies in Java 8 Part 2—Building simple proxies; published Jul. 14, 2015; https://opencredo.com/blogs/dynamic-proxies-java-part-2/; Retrieved on Dec. 18, 2018; (9 Pages).

Dominic Fox, New Tricks with Dynamic Proxies in Java 8 Part 3; published Aug. 18, 2015 https://opencredo.com/blogs/new-tricks-with-dynamic-proxies-in-java-8-part-3/; Retrieved on Dec. 18, 2018; (7 Pages).

APPLICATION DEPLOYMENT USING REDUCED OVERHEAD BYTECODE

CROSS REFERENCES TO RELATED APPLICATIONS

This application is a continuation of and claims priority to and the benefit of U.S. patent application Ser. No. 16/224,264, filed on Dec. 18, 2018, the entire content of which is hereby incorporated by reference.

BACKGROUND

Computer systems may run applications or services that are provided via a server or cloud. The applications or services can be developed and deployed at runtime. Application instances or services may run within containers, which may be run on physical or virtual machines. For example, containers may encapsulate a runtime environment for an application instance or service. Application instances may be started or replicated across nodes and each application instance may require classes, artifacts, dependencies, annotations, libraries, etc. to be loaded at various times (e.g., configuration, runtime or deployment).

SUMMARY

The present disclosure provides new and innovative systems and methods for application deployment using reduced overhead bytecode. In an example, a system includes a memory, a processor in communication with the memory, and a recorder. The recorder is configured to obtain a proxy for each respective real object. Each respective real object is related to a respective service. The recorder is also configured to record a sequence of each invocation on each respective proxy and generate an intermediate representation of an application that is configured to invoke the sequence of each invocation on each real object associated with each respective proxy.

In an example, a method includes creating a recorder and obtaining a proxy for each respective real object. Each respective real object is related to a respective service. The method also includes recording a sequence of each invocation on each respective proxy and generating an intermediate representation of an application from the sequence.

In an example, a method includes creating a recorder object and recording a sequence of invocations on a plurality of proxies. Each proxy of the plurality of proxies is associated with a respective real object. The method also includes generating bytecode from the recorded sequence of invocations and executing the bytecode to start runtime services of an application by invoking the sequence of invocations on the real objects associated with the plurality of proxies.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
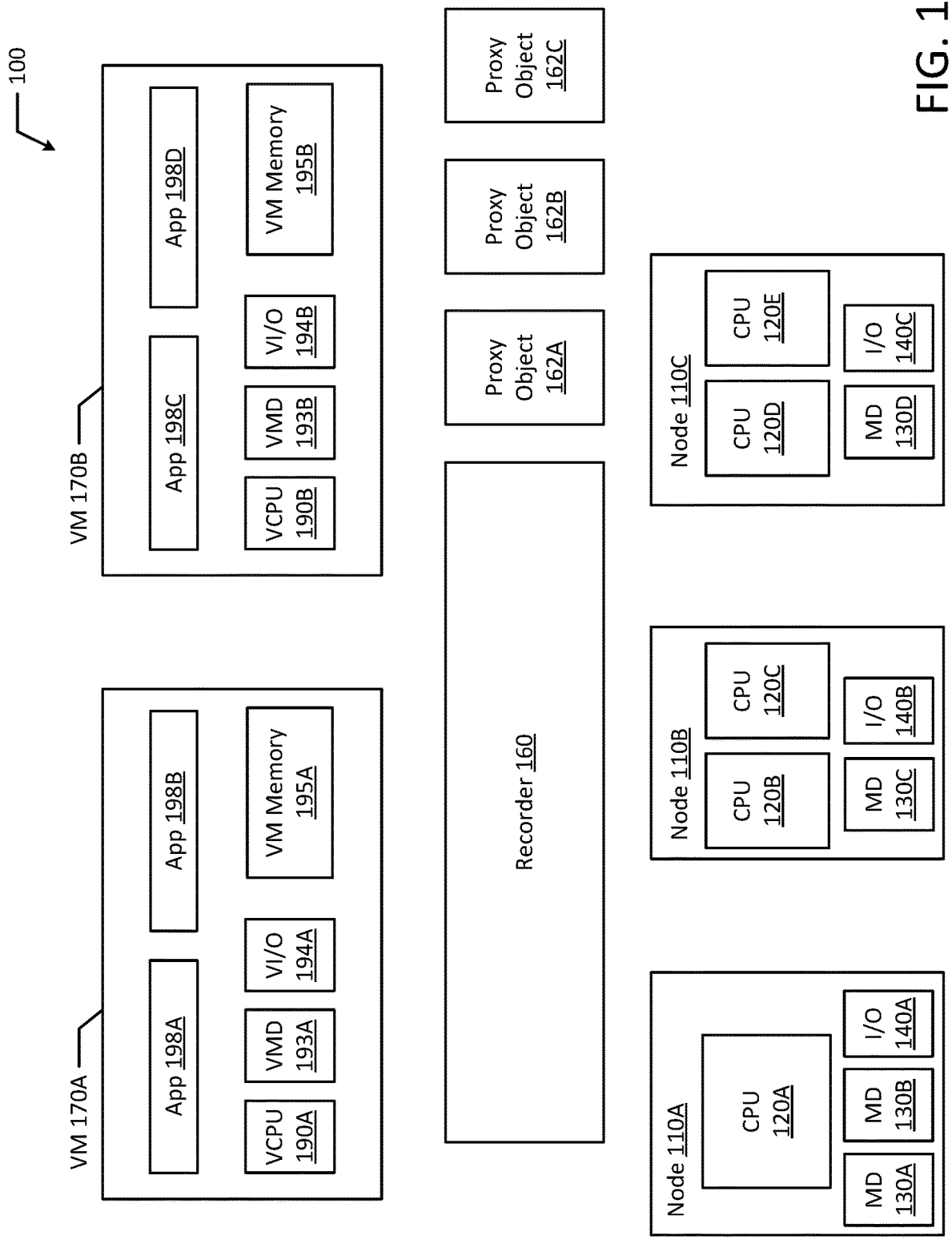
FIG. 1 illustrates a block diagram of an example computing system according to an example embodiment of the present disclosure.

Generating intermediate representations, such as custom Java bytecode, at runtime is a complex process that involves writing out the bytecode directly using a bytecode generation library. Typically, writing out the bytecode directly using a bytecode generation library requires extensive knowledge of Java Virtual Machine ("JVM") internals. The complexity of generating bytecode typically makes such implementations difficult to integrate. For example, a security provider interface ("SPI") may require users to generate bytecode directly and thus may be too difficult for an average developer to easily work with. Developers and programmers use engine classes to perform desired operations and each engine class may have a public interface that defines the operations the engine can perform. However, the engine classes may employ third-party security providers. For example, the engine classes have an additional interface called the SPI. The SPI is a set of methods that a particular engine must implement in order provide a particular operation.

To automate and simplify the intermediate representation (e.g., bytecode) generation process, techniques are disclosed for application deployment using reduced overhead intermediate representations including generating an intermediate representation (e.g., bytecode) using proxy based action recorders. Proxy based action recorders allow users (e.g., developers and programmers) to call methods on proxy objects (e.g., proxies associated with real objects) such that invocations are recorded and written out into an intermediate representation (e.g., bytecode). The intermediate representation (e.g., bytecode) generated by the recorder performs the same sequence of invocations on the real objects. Additionally, the intermediate representations may be generated at build time to reduce application startup time and runtime memory usage. Generating intermediate representation(s) (e.g., bytecode) prior to runtime (e.g., at build time) improves efficiency by allowing runtime services to start sooner and with a smaller runtime memory footprint. Specifically, by pre-generating the intermediate representation (e.g., bytecode) using a recorder, rather than directly writing out the intermediate representation (e.g., bytecode), the intermediate representation may be implemented by less experiences users. By deploying applications using the intermediate representation (bytecode), fewer resources are consumed when starting nodes and application instances by executing the intermediate representation.

As described in the various example embodiments disclosed herein, to automatically generate intermediate representations (e.g., Java bytecode) without extensive knowledge of writing out Java bytecode directly and to eliminate the need to generate intermediate representations (e.g., custom Java Virtual Machine ("JVM") bytecode) at runtime, the system and methods disclosed herein advantageously record invocations and automatically write out the intermediate representations that perform the same sequence of invocations. The intermediate representations (e.g., custom JVM bytecode) may be generated at build time, which can be directly executed at runtime to conserve system resources. For example, the systems and methods disclosed herein may create a recorder, obtain a proxy for each respective real object that the user plans to invoke on, record a sequence of each invocation on each respective proxy, and generate an intermediate representation (e.g., Java bytecode) of an application from the sequence.

By allowing a user to call methods on a proxy, and recording the invocations such that the recorder can write out or generate associated bytecode, developers or programmers may generate bytecode without having extensive knowledge of JVM internals or bytecode generation libraries. By calling methods and invocations (including method parameters) on the proxies up front at build time, fewer resources are used when starting nodes in a cloud environment. The present disclosure is especially advantageous to cloud providers that want to optimize the efficiency of the cloud by reducing startup times and reducing memory usage. For example, cloud providers like the Red Hat® Cloud Suite may utilize bytecode for application instances to reduce overhead. By pre-generating the bytecode and later executing the bytecode at runtime, the systems and methods disclosed herein consume less runtime memory because the resulting deployed application is smaller (i.e., contains less classes) than applications that are typically built at runtime.

FIG. 1 depicts a high-level component diagram of an example computing system 100 in accordance with one or more aspects of the present disclosure. The computing system 100 may include a recorder 160, proxy objects 162A-C (also referred to herein as a proxy or proxies), one or more virtual machines (VM 170A-B), and nodes (e.g., nodes 110A-C).

Recorder 160 may be a recorder object and may record invocations of the proxy objects 162A-C. For example, a user (e.g., developer or programmer) may obtain proxy objects 162A-C for associated real objects. The user may invoke the proxy objects 162A-C by calling methods on the proxy objects 162A-C. These invocations are recorded by the recorder 160 in the sequence in which they are invoked. The recorder 160 may also generate an intermediate representation (e.g., Java bytecode) from the recorded sequence of invocations. For example, when the user closes the recorder 160, the recorder 160 may generate bytecode. The recorder 160 may be a program running on a processor (e.g., CPU 120A-E or VCPU 190A-B). For example, VCPU 190A and VCPU 190B may each have their own translator that runs on the processor.

The bytecode may be executed to start runtime services for various applications (e.g., Applications 198A-D). For example, the bytecode may bootstrap runtime services by directly calling runtime classes when the bytecode is executed. Additionally, the bytecode may be translated into machine code for the virtual machines 170A-B at runtime. In an example, applications 198A-D may be different applications or services. In another example, applications 198A-D may be different instances of the same application or service.

Virtual machines 170A-B may include a virtual machine memory (VM Memory), a virtual CPU (VCPU), virtual memory devices (VMD), and virtual input/output devices (VI/O). For example, virtual machine 170A may include virtual machine memory 195A, a virtual CPU 190A, a virtual memory devices 192A, and a virtual input/output device 194A. Similarly, virtual machine 170B may include virtual machine memory 195B, a virtual CPU 190B, a virtual memory devices 192B, and virtual input/output device 194B.

In an example, a virtual machine 170A may execute a guest operating system and run applications 198A-B which may utilize the underlying VCPU 190A, VMD 192A, and VI/O device 194A. One or more applications 198A-B may be running on a virtual machine 170A under the respective guest operating system. A virtual machine (e.g., VM 170A-B, as illustrated in FIG. 1) may run on any type of dependent, independent, compatible, and/or incompatible applications on the underlying hardware and operating system ("OS"). In an example, applications (e.g., App 198A-B) run on a virtual machine 170A may be dependent on the underlying hardware and/or OS. In another example embodiment, applications 198A-B run on a virtual machine 170A may be independent of the underlying hardware and/or OS. For example, applications 198A-B run on a first virtual machine 170A may be dependent on the underlying hardware and/or OS while applications (e.g., application 198C-D) run on a second virtual machine (e.g., VM 170B) are independent of the underlying hardware and/or OS. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186 while applications 198C-D run on another virtual machine 170B are incompatible with the underlying hardware and/or OS 186.

In an example, virtual machines 170A-B may instead be containers that execute applications or services, such as microservices. In an example, the containers may each run a process or service and the containers may be executed in any execution environment. For example, the containers may operate as a virtual server. It should be appreciated that containers may be stand-alone execution environments, similar to that of a virtual machine. The applications 198A-D or services (e.g., microservices) may run in a software container or a virtual machine (e.g., virtual machines 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
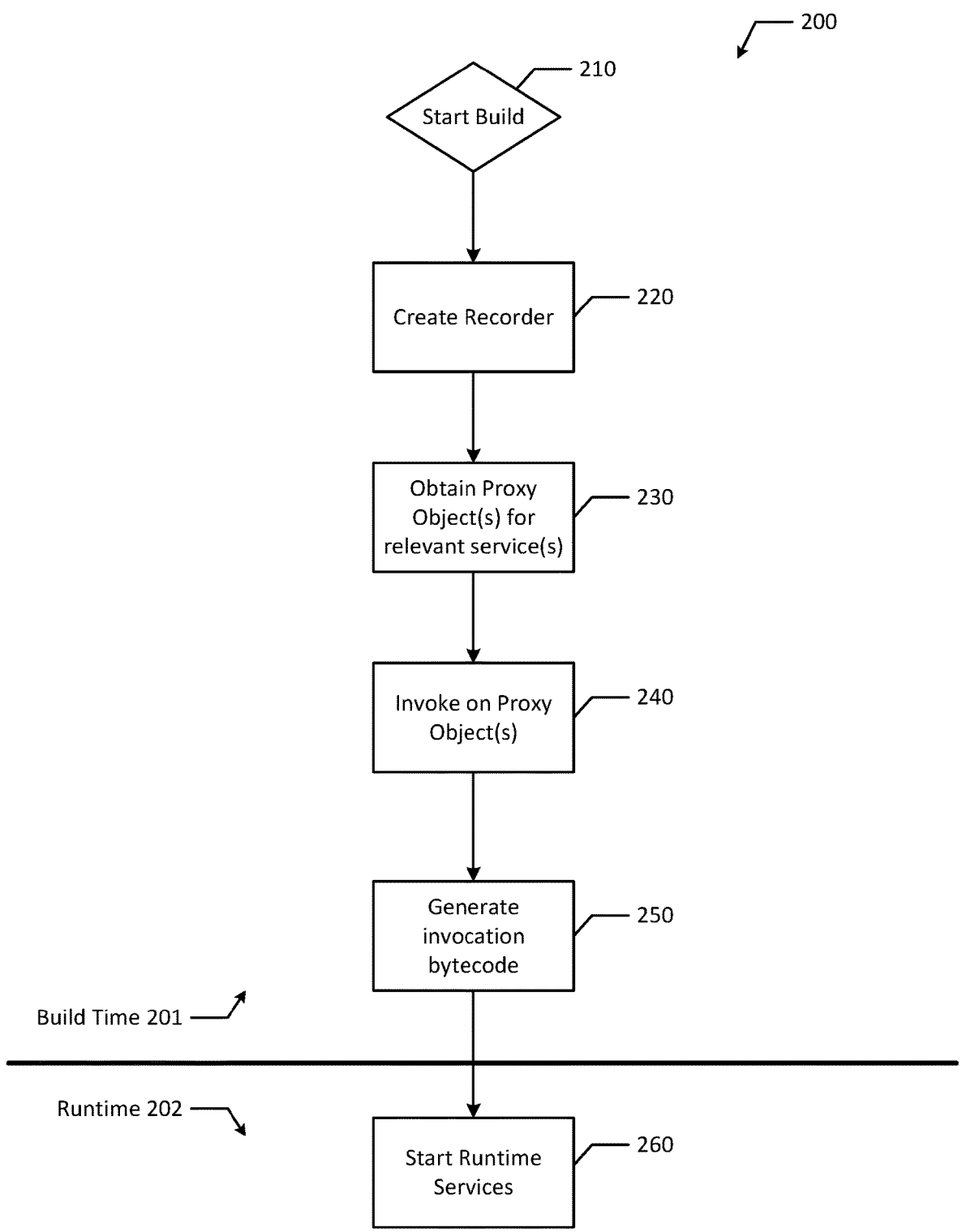
FIG. 2 illustrates a flowchart of an example process for generating bytecode for application deployment at build time according to an example embodiment of the present disclosure.

FIG. 2 illustrates a flowchart of an example method 200 for generating bytecode for application deployment. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. The method 200 may be performed by processing logic that may comprise hardware (circuitry, dedicated logic, etc.), software, or a combination of both.

The example method 200 includes starting an application build (block 210) prior to runtime 202 (e.g., at build time 201). Then, method 200 includes creating a recorder 160 (block 220) and obtaining proxy object(s) for relevant service(s) (block 230). Proxy objects 162A-B may be obtained for a service, such as a "web service setup" service or a "start web server" service. The user (e.g., developer or programmer) may invoke on the proxy object(s) (block 240) prior to runtime 202. For example, the user may call a sequence of methods on the proxy object(s) 162A-C. In an illustrative example, the user may call methods on the "web service setup" service and the "start web server" service or object to add web endpoints and then start a server. The invocation may also include method parameters, for example, the "start web server" object or service may include a parameter for the integer port that identifies which port the web server listens to. In an example, the parameter may indicate or define port_80. The recorder 160 may record the sequence of invocations and generate invocation bytecode (block 250). For example, the bytecode is generated to invoke a similar series or sequence of invocations on the real object(s) associated with the proxy object(s). In an example, the recorder 160 may automatically generate the bytecode after the recorder is stopped or paused.

The bytecode may invoke on the real objects or services, such as "web service setup" and "start web server." As discussed above, the bytecode may be executed to invoke on the real objects (e.g., call methods on the real objects) in order to add web endpoints and start the server.

Then, at runtime 202, method 200 includes starting runtime services (block 260). For example, the bytecode may be executed to start runtime services and the executed bytecode may bootstrap the runtime services. When the application is started, the bytecode is run directly, advantageously allowing runtime services to be started efficiently without having to generate or write out the bytecode directly at runtime 202. By pre-generating the bytecode using a recorder 160, extensive knowledge of bytecode generation libraries or JVM internals is not necessary thereby allowing more users (e.g., developers or programmers) to implement and integrate the bytecode. Additionally, the bytecode described herein conserves system resources (e.g., runtime memory) and reduces startup times. The memory savings become more substantial when starting nodes or application instances in cloud environments. For example, using an additional MB of memory at build time may not appear significant for a single application, but in cloud environments with thousands of nodes running application instances (where each would use an additional MB of runtime memory), the runtime memory savings is more pronounced.

Figure 3:
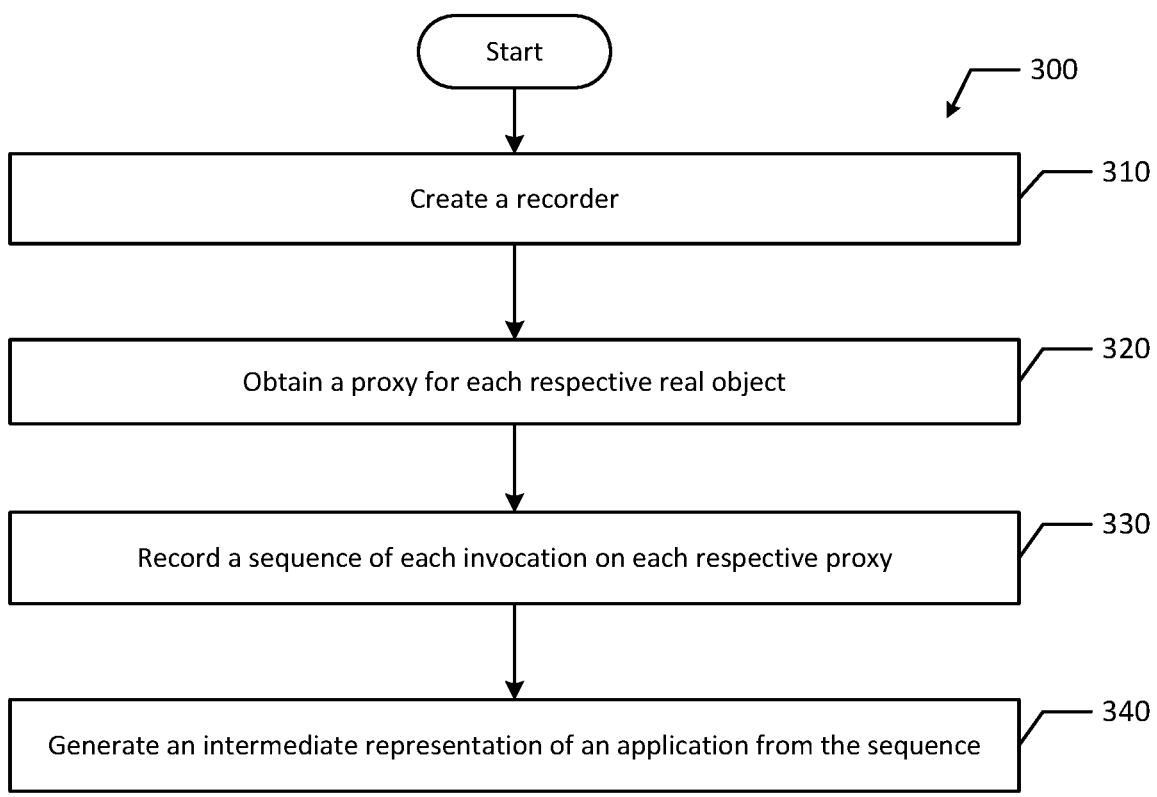
FIG. 3 illustrates a flowchart of an example process for generating an intermediate representation for application deployment according to an example embodiment of the present disclosure.

FIG. 3 illustrates a flowchart of an example method 300 for generating an intermediate representation for application deployment. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

The example method 300 includes creating a recorder (block 310). For example, a user may create a recorder 160. In an example, the recorder 160 may be created prior to runtime (e.g., at build time). Then, method 300 includes obtaining a proxy for each respective real object (block 320). For example, a user may obtain a proxy object (e.g., proxy object 162A-C) for each respective real object that the user intends to call methods on or invoke on. In an example, each respective real object may be related to a respective service. As discussed above, a service may be a "web service setup" service or object, which may be invoked to add web endpoints prior to starting a server. Additionally, method 300 includes recording a sequence of each invocation on each respective proxy (block 330). For example, the recorder 160 may record a sequence of each invocation (e.g., methods and the method parameters called) on each respective proxy object (e.g., proxy objects 162A-C). The sequence may include the series of invocations on each proxy object (e.g., proxy objects 162A-C) in the order the invocations are called by the user. Multiple invocations or calls may be performed on the same proxy object. For example, the sequence may include an invocation on proxy object 162A, followed by three invocations on proxy object 162B, followed by two invocations on proxy object 162B, and finally another invocation of proxy object 162A.

Some objects or service templates may include a single method. Conversely, other templates may include multiple methods such that invoking on the proxy object may include calling one of a plurality of methods. In some cases, the same proxy object may be invoked several times during a recording session, either consecutively or intermittently.

Method 300 also includes generating an intermediate representation of an application from the sequence (block 340). For example, the recorder 160 may generate the intermediate representation of an application (e.g., application 198A-D) prior to runtime 202. The intermediate representation may be automatically generated once the recorder 160 is done recording (e.g., when the user pauses or stops the recorder). The intermediate representation may be bytecode, such as JVM bytecode. The bytecode (e.g., JVM bytecode) may also be referred to as portable code or p-code. The bytecode is a form of instruction set designed for efficient execution by a software interpreter, and the bytecode is a compact numeric code that encode the result of invoking a similar series or sequence of invocations on the real objects associated with the proxy objects 162A-C. It should be appreciated that other forms of bytecode or native executable files may be generated. For example, common language runtime ("CLR") bytecode, common intermediate language ("CIL") bytecode or other executable codes may be generated all of which may be referred to as intermediate representations. By pre-generating the bytecode, application instances or runtime services may advantageously be started efficiently without directly writing out or generating bytecode at runtime, which saves time and reduces the instant memory consumption of the application instance and reduces the memory footprint of the application during the applications life.

In an example, the proxy objects 162A-B may be discarded after the bytecode is generated. For example, proxy objects 162A-B may be created or obtained each time a user generates bytecode from a recorder 160.

Figure 4:
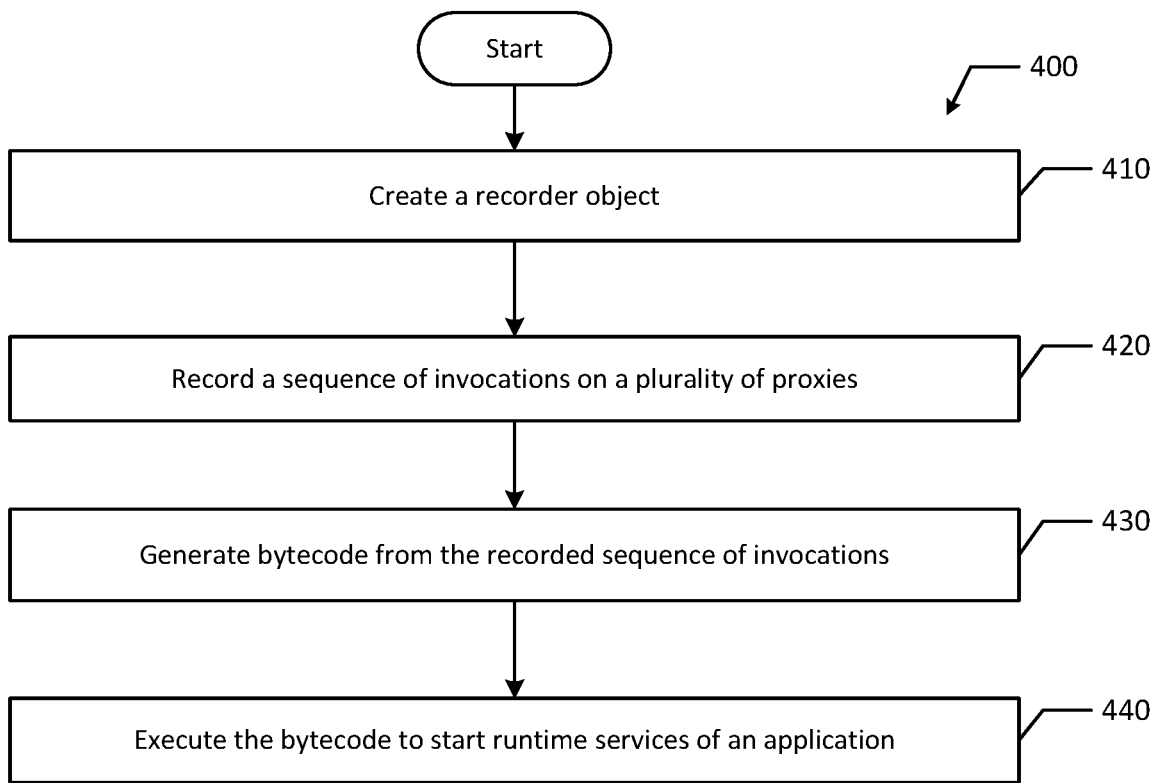
FIG. 4 illustrates a flowchart of an example process for application deployment using reduced overhead bytecode according to an example embodiment of the present disclosure.

FIG. 4 illustrates a flowchart of an example method 400 for application deployment using reduced overhead bytecode. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

The example method 400 includes creating a recorder object (block 410). For example, the user may create a recorder 160. In another example, the recorder 160 may be pre-created or may already exist in the current system architecture. Then, method 400 includes recording a sequence of invocations on a plurality of proxies (block 420). For example, the recorder object (e.g., recorder 160) may record a sequence of invocations on a plurality of proxies (e.g., proxy objects 162A-C) that are associated with respective real objects. The recorded invocations or methods called on the plurality of proxies may also include the method parameters associated with the called methods or invocations. Additionally, method 400 includes generating bytecode from the recorded sequence of invocations (block 430). For example, the recorder object (e.g., recorder 160) may generate bytecode from the recorded sequence of invocations. In an example, the generated bytecode may perform the same sequence or series of invocations on the real objects associated with the plurality of proxies (e.g., proxy objects 162A-C). The bytecode may be automatically generated by the recorder 160. For example, the recorder 160 my automatically generate the bytecode once the recorder is paused or stopped, prior to the recorder 160 exiting or closing.

In an example, recorder 160 may be associated with a specific virtual machine. For example, the recorder 160 may run on VM 170A, which may generate the bytecode. Then, method 400 includes executing the bytecode to start runtime services of an application (block 440). For example, executing the bytecode may include invoking real objects and calling methods. In an example, the bytecode may be executed after generation (e.g., after build time or at runtime). The virtual machine (e.g., VM 170A-B) that executes the bytecode may be the same virtual machine (e.g., VM 170A) that generated the bytecode. In another example, the virtual machine (e.g., VM 170B) that executes the bytecode may be different from the virtual machine (e.g., VM 170A) that generated the bytecode. Similarly, the virtual machine that creates the recorder object may be the same virtual machine or different virtual machine that executes the recorder object (e.g., records sequence of invocations). Furthermore, the virtual machine that creates and/or executes the recorder object may be the same virtual machine or a different virtual machine that generates and/or executes the bytecode. Additionally, different virtual machine instances or different virtual machines may generate and execute the bytecode. The different virtual machine instances or different virtual machines may be on the same node (e.g., computer or machine) or on different nodes (e.g., computers or machines).

Figure 5A:
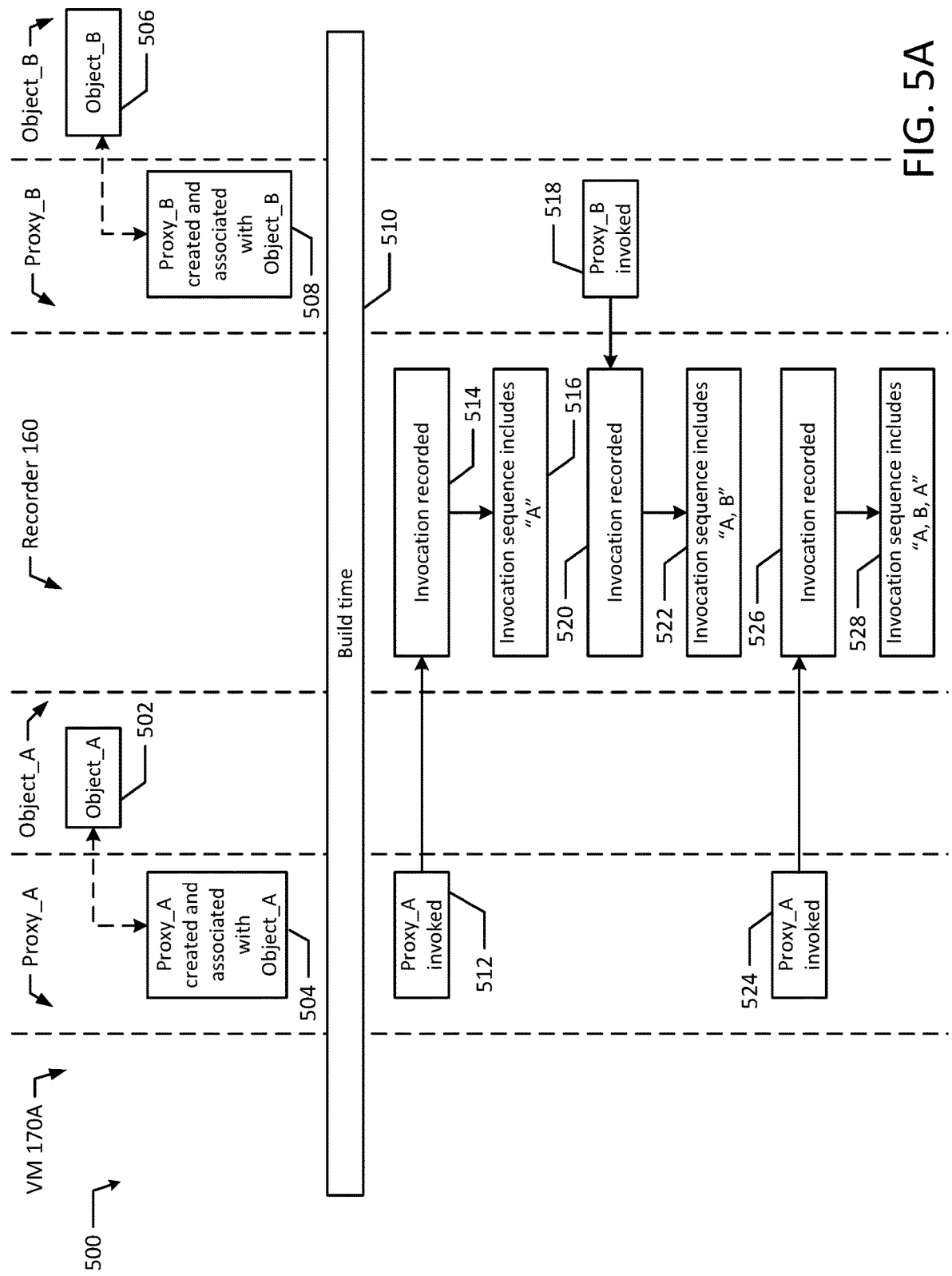
FIGS. 5A and 5B illustrate a flow diagram of an example process for application deployment using reduced overhead bytecode according to an example embodiment of the present disclosure.
Figure 5B:
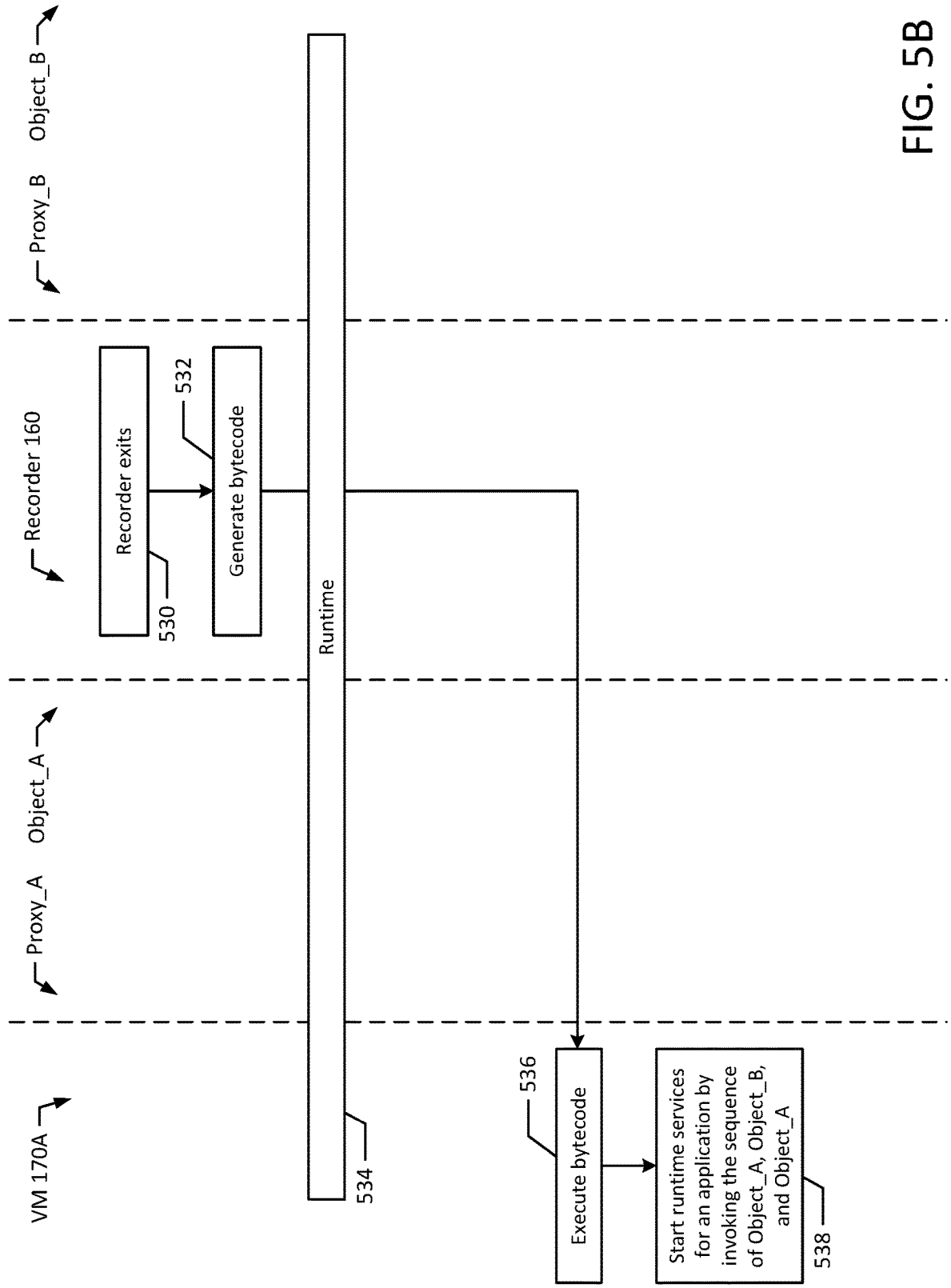

FIGS. 5A and 5B illustrates a flowchart of an example method 500 for application deployment using reduced overhead bytecode in accordance with an example embodiment of the present disclosure. Although the example method 500 is described with reference to the flowchart illustrated in FIGS. 5A and 5B it will be appreciated that many other methods of performing the acts associated with the method 500 may be used. For example, the order of some of the blocks may be changed, certain blocks may be combined with other blocks, blocks may be repeated, and some of the blocks described are optional. For example, a recorder 160, proxy objects (e.g., Proxy_A and Proxy_B) and virtual machine 170A may communicate to perform example method 500.

In the illustrated example, a real object (e.g., Object_A) includes methods and classes (block 502). For example, Object_A may be a "web service setup" object. A proxy object 162A (e.g., Proxy_A) may be created and associated with Object_A (block 504). For example, Proxy_A may include the same methods and classes as Object_A. Similarly, a real object (e.g., Object_B) includes methods and classes (block 506). For example, Object_B may be a "start web service" object. A proxy object 162B (e.g., Proxy_B) may be created and associated with Object_B (block 508). For example, Proxy_B may include the same methods and classes as Object_B.

At build time (block 510), a user may invoke on Proxy_A (block 512). For example, the user may call methods on Proxy_A. In an illustrative example, the user may call methods on Proxy_A to add a web endpoint prior to starting a server. Then, the recorder 160 records the invocation on Proxy_A (block 514). After recording the invocation, the invocation sequence includes the event of invoking Proxy_A (e.g., denoted by "A") resulting in a sequence of "A." (block 516). Then, the user may invoke on Proxy_B (block 518). For example, the user may call methods on Proxy_B. In the illustrative example, the user may call methods on Proxy_B to start the webserver. Then, the recorder 160 records the invocation on Proxy_B (block 520). After recording the invocation, the invocation sequence includes the event of invoking Proxy_B (e.g., denoted by "B") resulting in a sequence "A, B." (block 516). The user may again invoke on Proxy_A (block 524). For example, the user may call methods on Proxy_A. In the illustrative example, the user may call methods on Proxy_A to add another web endpoint after starting the server. Then, the recorder 160 records the invocation on Proxy_A (block 526). After recording the invocation, the invocation sequence includes the event of invoking Proxy_A (e.g., denoted by "A") resulting in a sequence "A, B, A." (block 528).

In the illustrated example, the sequence includes the order and details of each invocation. For example, the sequence may identify which specific methods or what method parameters are involved with each invocation. Multiple methods or invocations may be recorded for the same proxy object (e.g., Proxy_A or Proxy_B) in succession.

After the user has performed all the appropriate invocations (e.g., called methods) on the proxy objects 162A-B (e.g., Proxy_A and Proxy_B), the user may pause or stop the recorder 160. Then, the recorder 160 stops recording (block 530) and the recorder 160 generates bytecode (block 532). For example, the user may instruct the recorder 160 to exit or stop recording (e.g., pause the recorder). After the bytecode is generated, the recorder 160 may close. Automating and simplifying the bytecode generation process allows for implementing pre-generated bytecode at build time instead of runtime for various systems and SPIs. Additionally, applications started by executing the bytecode may save time and reduce the instant memory consumption of the application instance thereby reducing the memory footprint of the application during the applications life.

Once the bytecode is generated, the bytecode may be used to start runtime services for several application instances on the cloud on the same virtual machine or different virtual machines. In the illustrated example, the bytecode is pre-generated prior to runtime. For example, the bytecode may be generated well before any application instances are started on the cloud. Then, at runtime (block 534), virtual machine 170A may execute the bytecode (block 536). For example, to start an application instance, the virtual machine 170A may execute the bytecode directly. Upon executing the bytecode, the bytecode directly invokes the same sequence or series of invocations on real objects (e.g., Object_A and Object_B) (block 538). The bytecode advantageously allows for direct calls to classes used for runtime without loading classes used only for deployment, thereby reducing the amount of classes called and loaded during runtime. By calling and loading fewer classes, runtime memory usage and startup time is advantageously reduced.

Other instances of the application may also be started. In the illustrated example, other virtual machines (e.g., virtual machine 170B) may also execute the same bytecode. For example, to start another instance of the application, the virtual machine 170B may execute the previously generated bytecode directly. The resulting deployed application instances may be smaller than an application instance started using traditional approaches. By reducing runtime overhead of applications (e.g., Java applications), the memory footprint and memory consumption is advantageously reduced which provides performance and cost advantages, specifically in cloud environments.

Figure 6:
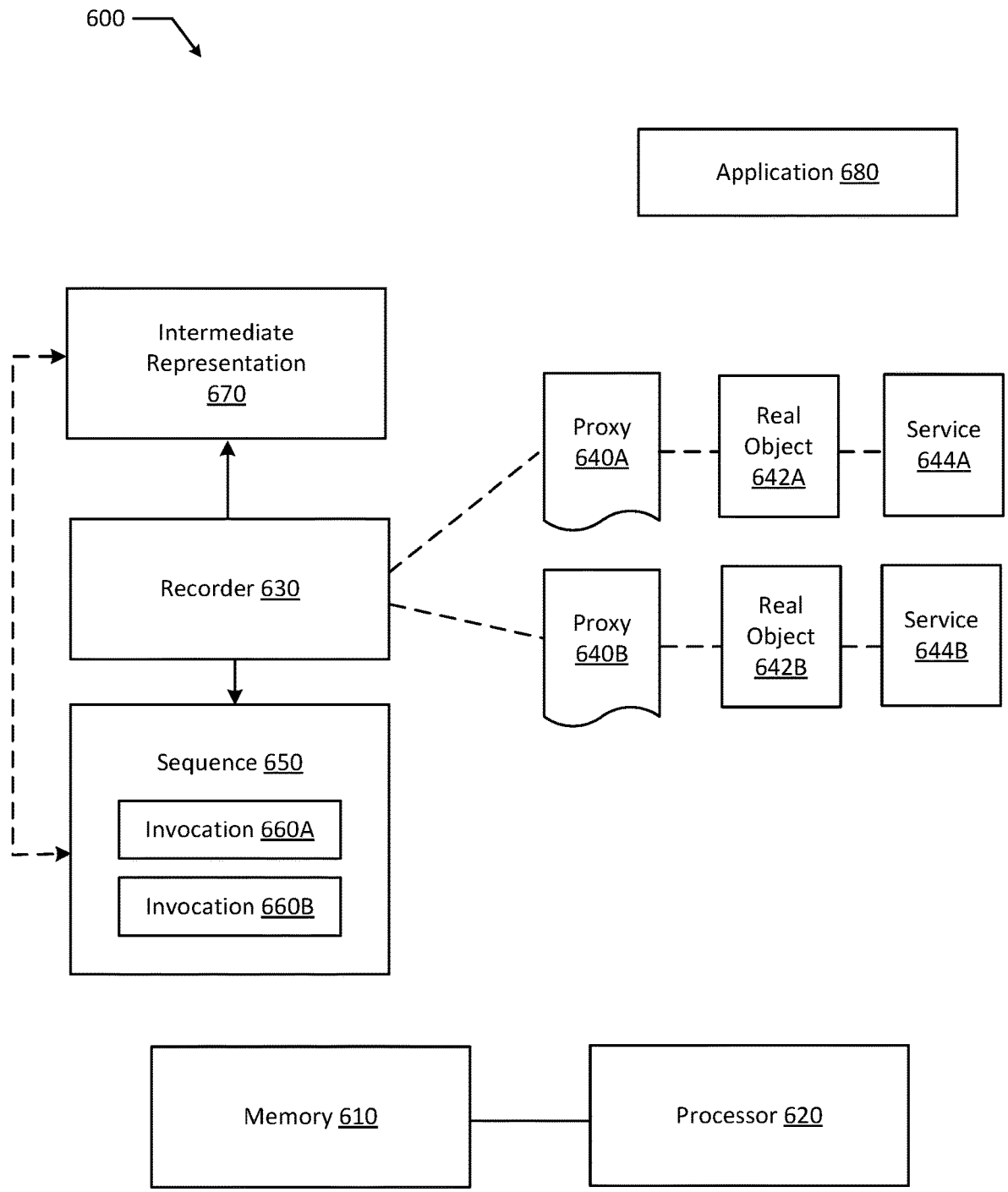
FIG. 6 illustrates a block diagram of an example bytecode generation system according to an example embodiment of the present disclosure.

FIG. 6 is a block diagram of an example bytecode generation system 600 using proxy based action recorders according to an example embodiment of the present disclosure. The bytecode generation system 600 includes a memory 610 and a processor 620 in communication with the memory 610. The system 600 may also include a recorder 630 configured to, obtain a proxy 640A-B for each respective real object 642A-B. Each respective real object 642A-B may be related to a respective service 644A-B. The recorder 630 may also be configured to record a sequence 650 of each invocation 660A-B on each respective proxy 640A-B. The recorder 630 may also be configured to generate an intermediate representation 670 of an application 680. The intermediate representation 670 may be configured to invoke the sequence 650 of each invocation 660A-B on each real object 642A-B associated with each respective proxy 640A-B.

By generating the intermediate representation 670 (e.g., bytecode) from the sequence 650 of invocations 660A-B, a user (e.g., developer or programmer) can automatically and generate bytecode by invoking on proxies 640A-B (e.g., calling methods on proxies 640A-B) instead of directly writing out bytecode using a bytecode generation library, which may require extensive knowledge of virtual machine internals or coding expertise. Accordingly, the disclosed system is user friendly and results in reduced runtime memory usage, increased startup efficiency, and reduces overall application deployment resource requirements.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system includes a memory, a processor in communication with the memory, and a recorder. The recorder is configured to obtain a proxy for each respective real object. Each respective real object is related to a respective service. The recorder is also configured to record a sequence of each invocation on each respective proxy and generate an intermediate representation of an application that is configured to invoke the sequence of each invocation on each real object associated with each respective proxy.

In a 2nd exemplary aspect of the present disclosure, which may be used in combination with any one or more of the preceding aspects (e.g., the 1st aspect), the intermediate representation is bytecode.

In a 3rd exemplary aspect of the present disclosure, which may be used in combination with any one or more of the preceding aspects (e.g., the 2nd aspect), the bytecode is Java Virtual Machine bytecode.

In a 4th exemplary aspect of the present disclosure, which may be used in combination with any one or more of the preceding aspects (e.g., the 1st aspect), the recorder is configured to generate the intermediate representation when the recorder stops recording.

In a 5th exemplary aspect of the present disclosure, which may be used in combination with any one or more of the preceding aspects (e.g., the 1st aspect), an invocation includes a method parameter.

Aspects of the subject matter described herein may be useful alone or in combination with one or more other aspects described herein. In a 6th exemplary aspect of the present disclosure, a method includes creating a recorder and obtaining a proxy for each respective real object. Each respective real object is related to a respective service. The method also includes recording a sequence of each invocation on each respective proxy and generating an intermediate representation of an application from the sequence.

In a 7th exemplary aspect of the present disclosure, which may be used in combination with any one or more of the preceding aspects (e.g., the 6th aspect), the intermediate representation is generated prior to runtime.

In an 8th exemplary aspect of the present disclosure, which may be used in combination with any one or more of the preceding aspects (e.g., the 7th aspect), the intermediate representation is generated at build time.

In a 9th exemplary aspect of the present disclosure, which may be used in combination with any one or more of the preceding aspects (e.g., the 6th aspect), the intermediate representation is bytecode.

In a 10th exemplary aspect of the present disclosure, which may be used in combination with any one or more of the preceding aspects (e.g., the 9th aspect), the bytecode is Java Virtual Machine bytecode.

In an 11th exemplary aspect of the present disclosure, which may be used in combination with any one or more of the preceding aspects (e.g., the 6th aspect), the method further includes, prior to generating the intermediate representation, pausing the recorder.

Aspects of the subject matter described herein may be useful alone or in combination with one or more other aspects described herein. In a 12th exemplary aspect of the present disclosure, a system includes a memory, a processor in communication with the memory, a recorder, and a plurality of virtual machines. The recorder is configured to record a sequence of invocations on a plurality of proxies. Each proxy of the plurality of proxies is associated with a respective real object. The recorder is also configured to generate bytecode from the recorded sequence of invocations. The plurality of virtual machines are configured to execute the bytecode generated by the recorder to start runtime services of at least one application.

Aspects of the subject matter described herein may be useful alone or in combination with one or more other aspects described herein. In a 13th exemplary aspect of the present disclosure, a method includes creating a recorder object, obtaining a first proxy for a first object related to a first service, and obtaining a second proxy for a second object related to a second service. The method also includes recording a sequence of invocations on at least one of the first proxy and the second proxy, generating bytecode that is configured to invoke the sequence of invocations on the first object and the second object, and discarding the first proxy and the second proxy.

In a 14th exemplary aspect of the present disclosure, which may be used in combination with any one or more of the preceding aspects (e.g., the 13th aspect), the bytecode is generated prior to runtime.

In a 15th exemplary aspect of the present disclosure, which may be used in combination with any one or more of the preceding aspects (e.g., the 15th aspect), the bytecode is generated at build time.

In a 16th exemplary aspect of the present disclosure, which may be used in combination with any one or more of the preceding aspects (e.g., the 13th aspect), the bytecode is Java Virtual Machine bytecode.

In a 17th exemplary aspect of the present disclosure, which may be used in combination with any one or more of the preceding aspects (e.g., the 13th aspect), the method further includes, prior to generating the bytecode, pausing the recorder.

Aspects of the subject matter described herein may be useful alone or in combination with one or more other aspects described herein. In an 18th exemplary aspect of the present disclosure, a method includes creating a recorder object and recording a sequence of invocations on a plurality of proxies. Each proxy of the plurality of proxies is associated with a respective real object. The method also includes generating bytecode from the recorded sequence of invocations and executing the bytecode to start runtime services of an application by invoking the sequence of invocations on the real objects associated with the plurality of proxies.

In a 19th exemplary aspect of the present disclosure, which may be used in combination with any one or more of the preceding aspects (e.g., the 18th aspect), the bytecode is generated prior to runtime.

In a 20th exemplary aspect of the present disclosure, which may be used in combination with any one or more of the preceding aspects (e.g., the 19th aspect), the bytecode is generated at build time.

In a 21st exemplary aspect of the present disclosure, which may be used in combination with any one or more of the preceding aspects (e.g., the 18th aspect), the bytecode is Java Virtual Machine bytecode.

In a 22nd exemplary aspect of the present disclosure, which may be used in combination with any one or more of the preceding aspects (e.g., the 18th aspect), the method further includes, prior to generating the bytecode, pausing the recorder object.

Aspects of the subject matter described herein may be useful alone or in combination with one or more other aspects described herein. In a 23rd exemplary aspect of the present disclosure, a system includes a means for creating a recorder, a means for obtaining a proxy for each respective real objected related to a service, and a means for recording a sequence of each invocation on each respective proxy. The system also includes a means for generating, prior to runtime, an intermediate representation of an application that is configured to invoke the sequence of on each real object associated with each respective proxy.

Aspects of the subject matter described herein may be useful alone or in combination with one or more other aspects described herein. In a 24th exemplary aspect of the present disclosure, a system includes a means for creating a recorder object and a means for recording a sequence of invocations on a plurality of proxies. Each proxy of the plurality of proxies is associated with a respective real object. The system also includes a means for generating bytecode from the recorded sequence of invocations and a means for executing the bytecode to start runtime services of an application by invoking the sequence of invocations on the real objects associated with the plurality of proxies.

In a 25th exemplary aspect of the present disclosure, which may be used in combination with any one or more of the preceding aspects (e.g., the 24th aspect), the system further includes, prior to generating the bytecode, a means for pausing the recorder object prior to generating the bytecode.

Aspects of the subject matter described herein may be useful alone or in combination with one or more other aspects described herein. In a 26th exemplary aspect of the present disclosure, a non-transitory machine readable medium stores code, which when executed by a processor, is configured to create a recorder, obtain a proxy for each respective real objected related to a service and record a sequence of each invocation on each respective proxy. Additionally, the non-transitory machine-readable medium is configured to generate, prior to runtime, an intermediate representation of an application that is configured to invoke the sequence of on each real object associated with each respective proxy.

In a 27th exemplary aspect of the present disclosure, which may be used in combination with any one or more of the preceding aspects (e.g., the 26th aspect), the intermediate representation is bytecode.

In a 28th exemplary aspect of the present disclosure, which may be used in combination with any one or more of the preceding aspects (e.g., the 27th aspect), the bytecode is Java Virtual Machine bytecode.

In a 29th exemplary aspect of the present disclosure, which may be used in combination with any one or more of the preceding aspects (e.g., the 26th aspect), an invocation includes a method parameter.

Aspects of the subject matter described herein may be useful alone or in combination with one or more other aspects described herein. In a 30th exemplary aspect of the present disclosure, a non-transitory machine-readable medium stores code, which when executed by a processor, is configured to create a recorder object and record a sequence of invocations on a plurality of proxies. Each proxy of the plurality of proxies is associated with a respective real object. The non-transitory machine-readable medium is also configured to generate bytecode from the recorded sequence of invocations and execute the bytecode to start runtime services of an application by invoking the sequence of invocations on the real objects associated with the plurality of proxies.

In a 31st exemplary aspect of the present disclosure, which may be used in combination with any one or more of the preceding aspects (e.g., the 18th aspect), the bytecode is generated by a first virtual machine, and the bytecode is executed by a second virtual machine.

In a 32nd exemplary aspect of the present disclosure, which may be used in combination with any one or more of the preceding aspects (e.g., the 31st aspect), the first virtual machine and the second virtual machine are different virtual machines.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
creating a recorder object;
obtaining a first proxy for a first object related to a first service;
obtaining a second proxy for a second object related to a second service;
recording a sequence of invocations on the first proxy for the first object and the second proxy for the second object;
generating bytecode that is configured to invoke the sequence of invocations on the first proxy for the first object and the second proxy for the second object;
prior to generating the bytecode, closing the recorder object; and
discarding the first proxy for the first object and the second proxy for the second object.

2. The method of claim 1, wherein the bytecode is generated prior to runtime.

3. The method of claim 1, wherein the bytecode is generated at build time.

4. The method of claim 1, wherein the bytecode is Java Virtual Machine bytecode.

5. The method of claim 1, wherein an invocation of the sequence of invocations on the first proxy for the first object and the second proxy for the second object includes a method parameter.

6. A system comprising:
a memory;
a processor in communication with the memory;
a recorder, wherein the recorder is configured to:
record a sequence of invocations on a plurality of proxies, wherein each proxy of the plurality of proxies is associated with a respective real object, and
generate bytecode from the recorded sequence of invocations on the plurality of proxies, wherein the recorder is configured to generate the bytecode when the recorder is closed; and
a plurality of virtual machines configured to execute the bytecode generated by the recorder to start runtime services of at least one application.

7. The system of claim 6, wherein the bytecode is generated prior to runtime.

8. The system of claim 6, wherein the bytecode is generated at build time.

9. The system of claim 6, wherein the bytecode is Java Virtual Machine bytecode.

10. The system of claim 6, wherein the recorder is configured to generate the bytecode when the recorder stops recording.

11. The system of claim 6, wherein an invocation of the recorded sequence of invocations on the plurality of proxies includes a method parameter.

12. The system of claim 6, wherein the plurality of virtual machines includes a first virtual machine and a second virtual machine, and wherein the bytecode is generated by the first virtual machine.

13. The system of claim 12, wherein the bytecode is executed by the second virtual machine.

14. A non-transitory machine-readable medium storing code, which when executed by a processor, is configured to:

create a recorder;

obtain a proxy for each respective real object related to a service;

record a sequence of each invocation on each real object associated with each respective proxy; and generate, prior to runtime, an intermediate representation of an application that is configured to invoke the sequence of each invocation on each real object associated with each respective proxy, wherein the recorder is paused prior to generating the intermediate representation of the application.

15. The non-transitory machine-readable medium of claim 14, wherein the intermediate representation of the application is bytecode.

16. The non-transitory machine-readable medium of claim 15, wherein the bytecode is Java Virtual Machine bytecode.

17. The non-transitory machine-readable medium of claim 14, wherein an invocation of the sequence of each invocation on each real object associated with each respective proxy includes a method parameter.

* * * * *